United States Patent [19]

Dudman

[11] Patent Number: 4,457,491
[45] Date of Patent: Jul. 3, 1984

[54] EXTREME-TEMPERATURE SEALING DEVICE AND ANNULAR SEAL THEREFOR

[75] Inventor: Richard L. Dudman, Euclid, Ohio

[73] Assignee: EGC Enterprises Incorp., Mentor, Ohio

[21] Appl. No.: 448,199

[22] Filed: Dec. 9, 1982

[51] Int. Cl.³ .............................................. F16K 5/06
[52] U.S. Cl. .................................. 251/317; 251/368; 277/234
[58] Field of Search ....................... 137/315, 317, 368; 277/DIG. 6, 234, 235 A

[56] References Cited

U.S. PATENT DOCUMENTS

| | | | |
|---|---|---|---|
| 2,249,127 | 7/1941 | Goetze | 277/234 |
| 2,768,806 | 10/1956 | Koehler | 251/317 |
| 3,185,489 | 5/1965 | Klinger-Lohr | 277/100 |
| 3,195,857 | 7/1965 | Shafer | 251/315 |
| 3,425,663 | 2/1969 | Priese | 251/180 |
| 3,567,176 | 3/1971 | Johnson | 251/174 |
| 3,671,010 | 6/1972 | Scaramucci | 251/317 |
| 4,004,776 | 1/1977 | Stender | 251/315 |
| 4,006,881 | 2/1977 | Gaillard | 251/214 |
| 4,220,172 | 9/1980 | Stager | 137/74 |
| 4,247,079 | 1/1981 | Friess | 251/174 |
| 4,269,391 | 5/1981 | Saito et al. | 251/315 |
| 4,397,472 | 8/1983 | Czernik | 277/DIG. 6 |

Primary Examiner—Martin P. Schwadron
Assistant Examiner—James R. Shay
Attorney, Agent, or Firm—Yount & Tarolli

[57] ABSTRACT

An extreme-temperature annular sealing element and a sealing device using such a sealing element is provided herein. The annular sealing element (10) is composed of a flexible expanded graphite body (14) with a protective metallic sheath (12) over a portion of the outer surface of said flexible expanded graphite body. One end surface (24) of the flexible expanded graphite body is exposed so that the annular sealing element can resiliently respond under repetitive loading and unloading pressures. The metallic sheath is thick enough to be durable yet thin enough to permit the flexible graphite body to resiliently yield and conform to a rotatable opposed member, such as a ball valve.

33 Claims, 7 Drawing Figures

EXTREME-TEMPERATURE SEALING DEVICE AND ANNULAR SEAL THEREFOR

FIELD OF INVENTION

The present invention relates to an extreme-temperature annular sealing element and a sealing device incorporating such a sealing element, such as ball valves and ball joints.

PRIOR ART

There is a demand for extreme-temperature sealing devices in a wide variety of applications. One particular application is a fire proof valve, such as a ball valve, which is required for use in petrochemical plants or in handling combustible fluids. In the event of a fire, it is important that all elements of a valve, especially the seal elements, be resistant to high temperatures encountered in a fire. Since many materials cannot withstand high temperatues caused by a fire, most fire proof valves, such as ball valves, are constructed of fire resistant metals. This means that annular ball valve seats and the ball element must both be constructed of metal. In order to ensure a proper seal, a metal-to-metal contact requires that the metal ball valve seals be precisely machined and lapped to match each individual ball with its respective seals. Obviously, such a machining practice is both expensive and time consuming.

Various attempts have been made to form an extreme-temperature resistant sealing element while still retaining the advantages of metal, namely durability and resistance to extreme-temperatures. An early attempt is illustrated by Priese U.S. Pat. No. 3,425,663 which formed the valve seats for a ball valve from a sintered carbon-graphite material. However, such a sintered graphite material is relatively hard and must be machined so as to match the surface of the seat. Johnson U.S. Pat. No. 3,567,176 proposed the use of annular ball valve seats composed of an expanded graphite material such as Grafoil, but such a structure is not durable since the expanded graphite annular ball valve seat would easily erode under the flow of fluid and the abrasion from movement of the ball element. Stender U.S. Pat. No. 4,004,776 employed metallic annular ball valve seats in conjunction with resilient 0-rings in contact with a valve body member. However, such a structure still required accurate matching of the surfaces of the seat and the ball valve and utilized a material, such as Viton-A type rubber, that is not as high-temperature resistant as other materials, such as graphite. Gaillard U.S. Pat. No. 4,006,881 used a resilient expanded graphite material as a packing washer for an otherwise normal graphite valve seat. A similar structure is disclosed in Saito U.S. Pat. No. 4,269,391 wherein the seat is composed of metal or graphite. In each case, however, the hard graphite or metal valve seat has to be machined to precisely conform to the shape of the closure element. Friess U.S. Pat. No. 4,247,079 disclosed a valve sealing element composed of a stainless steel casing and asbestos fibers. Such a structure was stated to be extremely fire proof. Flexibility of the annular sealing element was due to the relatively thick casing and therefore the annular contact surface still required certain finishing steps, such as polishing or precision machining.

The foregoing patents illustrate the numerous—but unsuccessful—attempts of the prior art to achieve an extreme-temperature sealing element using expanded graphite or other non-metallic materials. Other attempts have been made at achieving a fire proof ball valve using expanded graphite annular seals. Such devices exposed the expanded graphite seal directly to fluid flow and the rotatable valve member, thus causing failure of the sealing element due to abrasion from both the ball valve element and fluid flow. Accordingly, it can be seen that the prior art failed to achieve an extreme-temperature annular sealing element having the durability and temperature resistant properties of a metal annular sealing element without the disadvantages thereof, i.e., precise machining.

SUMMARY OF INVENTION

The present invention is directed to an extreme-temperature annular sealing element and a sealing device using such an annular sealing element. The annular sealing element comprises a flexible expanded graphite body having an annular contact surface for sealing contact with a partially spherical sealing surface of a rotatable opposed member. The annular contact surface is protected by a metallic protective sheath affixed thereto. The metallic sheath has a thickness adapted to withstand sliding contact with a rotatable opposed member, but it is sufficiently thin to allow the flexible expandible graphite body to resiliently yield to seal the sheath against the rotatable opposed member. The protective metal sheath preferably can have a thickness in the range from about 0.002 inches to about 0.006 inches.

In a preferred form, a stamped metal protective sheath wraps around a portion of the outer circumferential periphery, an inner end surface, the annular contact surface and an inner circumferential periphery of an annular body of flexible expandible graphite. In some cases, it is desirable to further have the metal protective sheath wrap around onto a portion of the outer end surface of the annular sealing element. Additionally, it may be desirable to form a raised projection on the outer end surface to increase the ability for the flexible expanded graphite body to resiliently seal between the rotatable opposed member and a body member, such as a valve body.

The structural element of the seal of the present invention is the flexible expanded graphite sealing element, the metallic protective sheath protecting the expanded graphite body from abrasion from the rotatable member and fluid flow.

In this manner, the present invention achieves an extreme-temperature annular sealing element which can withstand very high and very low temperatures, on the order up to about 1000° F. and down to about −450° F. with the preferred materials as explained in more detail hereinafter.

A major advantage of the present invention is that the annular sealing element of the present invention has the advantages of an all metal annular sealing element, that is durability and resistance to extreme temperatures, while avoiding the deficiencies thereof, namely the need for precision machining. A further advantage, not present in prior art metal annular sealing elements is that the expanded graphite annular body of the present invention provides a resilient structure to permit the annular seal element to more closely conform to the opposed rotatable member to form a seal between that member and a body member. As is well recognized, solid metal annular seals would not be resilient. The annular sealing element according to the present invention also has the advantage that it is easy to construct, such as by die stamping, so that it can be formed into a variety of different shapes. The ease of manufacturing the annular sealing element according to the present invention permits the seal and devices therefor to be used in a wider variety of applications than had heretofore been practical.

DESCRIPTION OF PREFERRED EMBODIMENTS

Figure 1:
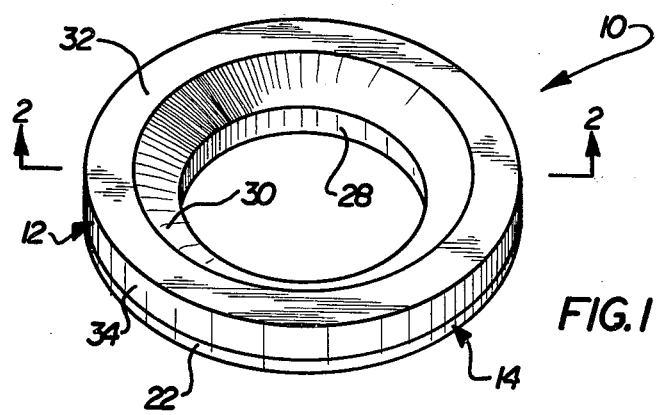
FIG. 1 is a perspective view of an annular sealing element according to the present invention.
Figure 2:
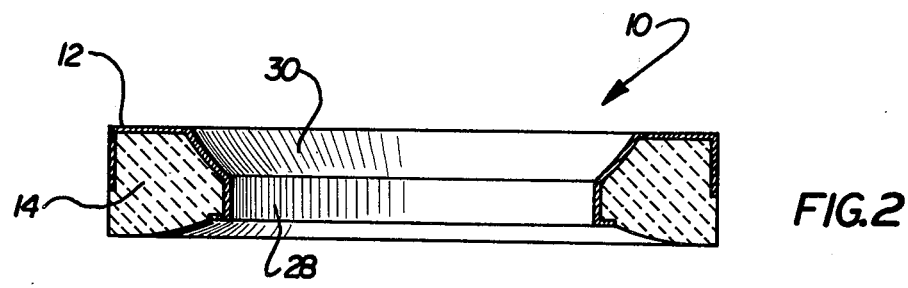
FIG. 2 is a cross section along line 2—2 of FIG. 1.

An extreme-temperature annular sealing element 10 according to the present invention is shown in perspective in FIG. 1 and in cross section in FIG. 2. The annular sealing element 10 is composed of a protective metal sheath 12 and an annular structural body 14 composed of a flexible expanded graphite material.

Figure 3:
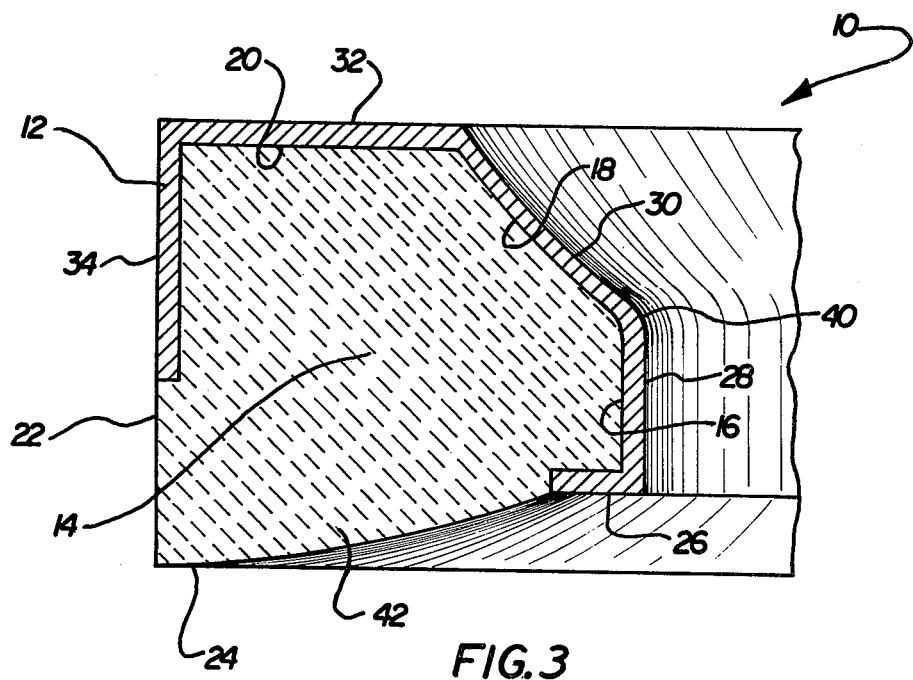
FIG. 3 is an enlarged cross section of one of the exposed surfaces shown in FIG. 2.

The annular sealing element is shown in an enlarged cross section in FIG. 3. The annular expanded graphite sealing element 14 as shown in the preferred embodiment in FIG. 3 has several surfaces: an inner circumferential periphery 16, an annular contact surface 18, an inner end face 20, an outer circumferential periphery 22 and an outer end surface 24. The annular contact surface 18 has a curved surface with a radius substantially to conform to a rotatable opposed member for sealing as hereinafter explained in more detail.

The protective metal sheath 12 is affixed to a portion of the outer end surface 24 and a portion of the outer circumferential periphery 22 of the flexible graphite body. As shown in the preferred embodiment in FIG. 3, the protective metal sheath 12 covers the entire surface portion of the inner circumferential periphery 16, the annular contact surface 18, and the inner end surface 20. As shown in FIGS. 1 and 2, the protective metal sheath 12 is a continuous metal sheath which wraps around or encompasses a portion of the annular sealing element 14.

The portion of the protective metal sheath 28 covering the inner circumferential periphery 16 serves to prevent the flexible expanded graphite sealing element 14 from being abraded by the flow of materials past the inner circumferential periphery 16. The portion of the protective metal sheath 26 which covers a portion of the outer end surface 24 also serves to protect the expanded graphite sealing element 14 from abrasion due to flow of fluid, particularly during unloading of the seal, and also assists in positioning and affixing the protective metal sheath 12 to the annular sealing element 14. A portion 30 of the protective metal sheath 12 covers the annular contact surface 18 of the sealing element 14. The portion 30 of the protective metal sheath covering the contact surface serves to prevent a sealing or closure element from abrading the annular contact surface 18 of the flexible expanded sealing element 14. However, the portion of the protective metal sheath 30 is sufficiently thin to allow the resilient properties of the flexible expanded graphite annular ring 14 to yield under pressure and to conform the sealing element to a closure or ball element. Further portions 32 and 34 of the protective metal sheath 12 cover, respectively, the inner end surface 20 and a portion of the outer circumferential periphery 22 of the annular sealing element 14. The portions 32 and 34 of the protective metal sheath also serve to protect the annular expanded graphite element 14 from abrasion and to assist in locating and securing the protective metal sheath to the flexible expanded graphite material.

At the joint between the portion 28 of the metal protective sheath covering the inner periphery 16 and the portion 30 of the protective metal sheath covering the annular contact surface 18 of the flexible graphite body a radius or curvature 40 is provided on the protective metal sheath. The purpose of the rounded edge 40 is to minimize the tendency of a ball or closure element during seating and unseating from the annular contact surface 18 to catch and tear the protective metal sheath from the flexible expanded graphite body 14.

If desired, the outer end surface 24 of the flexible expanded graphite body 14 can be provided with a raised projection 42. The purpose of the raised projection 42 is to improve the ability of the annular sealing element 10 to form a seat between a rotatable opposed member and a body member as explained in more detail hereinafter.

Figure 4:
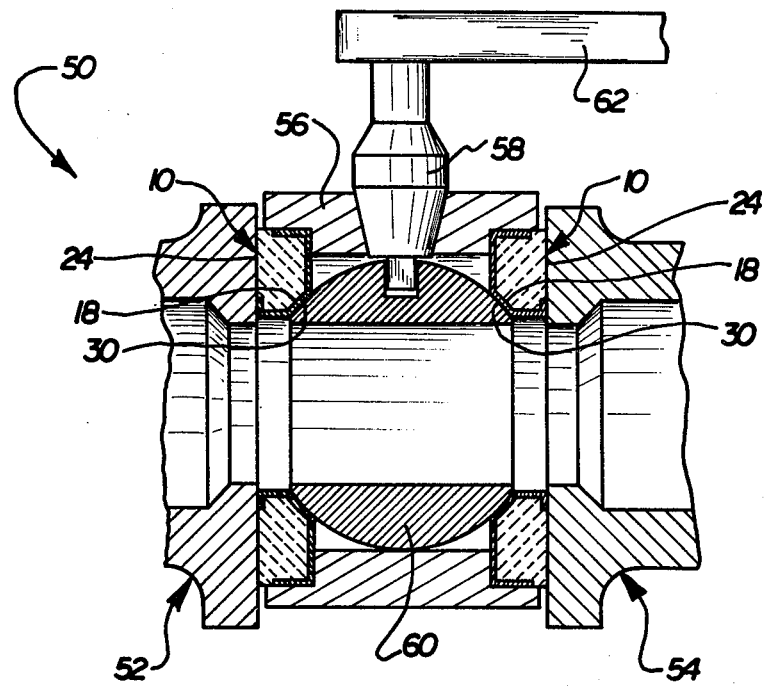
FIG. 4 is a cross section of a sealing device according to the present invention.

The annular sealing element 10 of the present invention can advantageously be used in a valve structure, such as a butterfly valve or a ball valve, or in a ball joint. FIG. 4 schematically illustrates in cross section the use of the annular sealing element of the present invention as seating elements for a ball valve. A ball valve 50 has flanged body members 52 and 54. A rotatable closure ball member 60 is encased within a valve body 56. A valve stem 58 is interlocked with the rotatable closure ball member 60 and is operated by a handle 62. The annular sealing element 10 of the present invention forms two seals between the rotatable closure member 60 and the flanged body members 52 and 54.

Each of the upstream and downstream annular sealing elements 10 has an outer end surface 24 (FIG. 3) which comprises a body member contact surface to seal against, respectively, the flanged valve body members 52 and 54. The annular contact surface 18, protected by sheath portion 30, is seated against the rotatable closure member 60. As shown in FIG. 4, when the annular sealing elements 10 are loaded in the ball valve, the body contact surface portion of the outer end surface 24 of the flexible graphite annular sealing element is compressed. The projection 42 (FIG. 3) tends to compress under loading until it forms a planar surface with the portion 26 of the metallic sheath.

Depending on the position of the ball closure element 60, the annular sealing element 10, particularly the upstream annular sealing element may become unloaded. By unloading, it is meant that there is a reduced pressure on the annular sealing element 10 such that it tends to move away from one of the flanged body members 52, 54. In that event, the projection 42 on the outer end surface 24 of the flexible graphite member 14 tends to expand and maintain sealing contact between the closure member 60 and the flanged body members 52 and 54.

Figure 5:
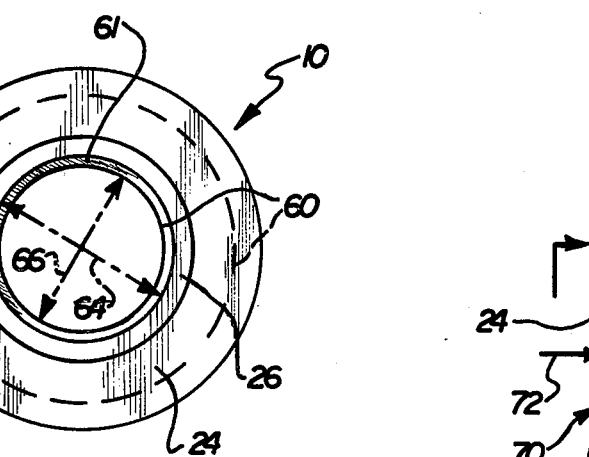
FIG. 5 is an end plan view of an annular sealing element and a ball valve element according to the present invention.

As can be seen in FIG. 4, the inner diameter of the annular sealing element is slightly greater than the diameter of the cylindrical flow passage through the ball closure member 60 and the ports in the body members 52, 54. This difference in diameter is exaggerated in FIG. 5, where the inner diameter 64 of the annular sealing element 10 is greater than the inner diameter 66 of the flow passage in the ball closure member 60. The difference in diameters in FIG. 5 is exaggerated for purposes of illustration. In full port valves, the diameter of the ports generally equals the diameter of the orifice in the ball member. Comparison of the inner diameter of the seal to the inner diameter of the port is more useful for the present invention since the body member must support the seal. In the present invention, it is preferred that the difference between the inner diameter of the annular sealing element and the inner diameter of the valve port in the valve body divided by the inner diameter of the sealing element (e.g., $(ID_s - ID_p)/ID_s$) be from about 3% to about 20%, preferably from about 5% to about 14%.

Figure 7:
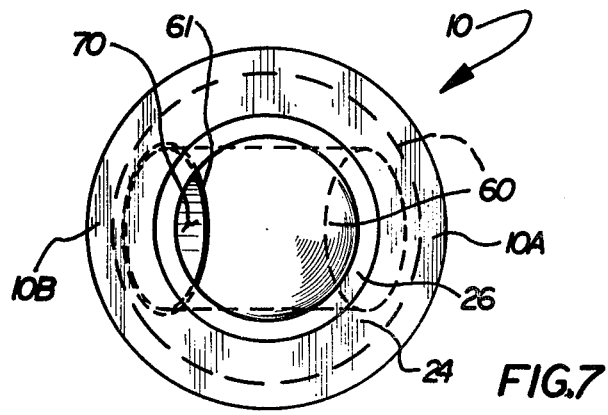
FIG. 7 is an end view of the seal and ball valve element as shown in FIG. 6.
Figure 6:
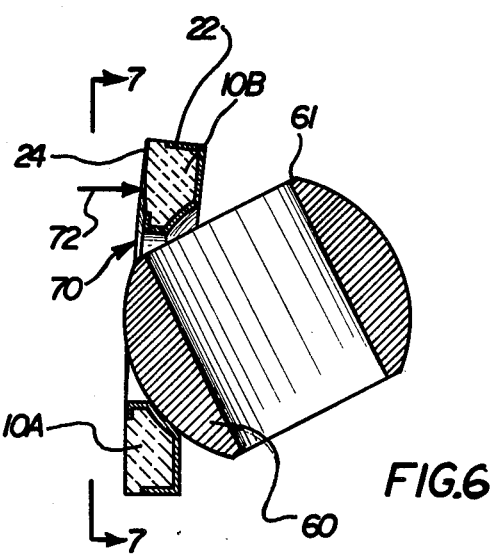
FIG. 6 is a cross sectional view through a longitudinal axis of a ball valve element with the annular sealing element of the present invention.

The unloading of an annular sealing element in a ball valve is illustrated in FIG. 6. FIG. 6 is a cross section through the axis of the annular sealing element and the rotatable closure member along the axis thereof, as seen from the "top" in FIG. 4. In FIG. 6, the upstream annular sealing element 10 is illustrated with the rotatable closure member 60 being partially open. Of course, the position of the rotatable closure member 60 illustrated in FIG. 6 occurs twice during a full cycle of the valve element, that is the rotatable closure member 60 is illustrated in a position when the closure member is about to move toward the fully closed position and when it is first moved towards the open position. An end view of the relationship between the annular sealing element 10 and the rotatable closure member is shown in FIG. 7. In the position illustrated in FIGS. 6 and 7, a fluid only "sees" a very small opening 70 in the valve element. Because of the small opening 70 in such a position of the closure member, the upstream annular seating element 10 is not supported by the ball for a portion of its perimeter compared to when the valve element 60 is in its fully open or closed position. This causes a flexing of the annular sealing element. The flexing occurs because one portion, 10A of the annular sealing element is at all times supported by the rotatable closure member 60 whereas another portion 10B is unsupported in FIGS. 6 and 7. Because of the fluid pressure illustrated by arrow 72 from the fluid flow, there is a tendency to force the portion 10B of the annular sealing element to flex or move downstream away from seating engagement with the flange body member. In that situation, the fluid pressure operates against outer end surface 24 and the outer circumferential periphery 22 causing a flexing or distortion of the annular sealing element 10.

As the rotatable closure member 60 comes to its fully open or closed position, there is a tendency, because of the flexing of the annular sealing element, for edge 61 of the rotatable member 60 to catch or grab the annular sealing element. This catching or grabbing of the annular sealing element 10 generally occurs at the junction between the inner circumferential periphery 16 and the annular contact surface 18 of the flexible graphite sealing element. This tendency to catch or grab is minimized by the present invention by not only providing the radius 40 on the metal protective sheath but also by making the inner diameter 64 of the annular sealing element 10 greater than the inner diameter of the ports and the passage 66 in the rotatable closure member 60. In contrast to the upstream seat, the downstream seat of a ball valve or ball joint is constantly loaded such that the tendency to grab or catch the thin protective metal sheath is not as great, but that tendency is still a factor in analyzing any failure of the annular sealing element.

Thus, the exposed portion of the outer end surface 24 of the present invention is important to provide the flexible graphite material with the ability to resiliently expand and compress under pressure due to constant loading and unloading of the annular sealing elements.

An extreme-temperature sealing device can be constructed in accordance with the present invention by using the annular sealing element to form a seal between a rotatable opposed member and a body member. Depending on the temperatures to which the sealing element is exposed, many materials can be used as a protective metal sheath. Various metals, such as stainless steels will suffice depending on the requirements for the extreme-temperature sealing device. For very low or very high temperatures, nickel-chromium based alloys, such as Inconel 718, are preferred. Depending on the uses, however, other materials such as cobalt based alloys also will suffice.

The annular body portion 14 of the annular sealing element 10 is a structural member composed of a flexible expanded graphite material. Flexible expanded graphite is a resilient material. The resiliency of the annular sealing element of the present invention derives from using flexible graphite as a structural member.

The protective metal sheath serves the purposes as mentioned above, primarily abrasion protection, and flexes under pressure from the body member and rotatable opposed member but does not itself provide any resiliency. The metal sheath must have a thickness sufficient to withstand sliding contact with the rotatable opposed member and thin enough to allow flexing against the expanded graphite body. The sheath must be thin enough to seal against an opposed member without precision machining. Preferably, the metal sheath has a thickness in the range of 0.002 inches to about 0.006 inches, most preferably from about 0.00250 inches to about 0.00425 inches.

The flexible expanded graphite annular sealing element can be formed from a variety of different expanded graphite structures. The annular sealing element can be formed from a single thickness of expanded graphite, laminated sheets of expanded graphite, or circumferential layers of expanded graphite about the axis of the annular sealing element.

Flexible expanded graphite sheets can be prepared, as is well known, by expanding graphite flakes many times and then compressing the expanded flakes to form a cohesive structure. The expansion of graphite flakes can be readily achieved by attacking the bonding forces between the layers of the internal structure of graphite, such as by the use of an acid. The result of such an attack is that the spacing between the superimposed layers can be increased so as to effect a marked expansion in the crystalline structure. The expanded particles can be formed under pressure into a foam material since the particles have the ability to adhere without a binder due to the large expansion. Sheets and the like are formed from the expanded graphite particles by simply increasing the compressive pressure, the density of the formed graphite being related to the applied formation pressure. A more complete description of the method of forming such flexible expanded graphite sheets can be found in U.S. Pat. No. 3,404,061, isued Oct. 1, 1968. Typically, such flexible expanded graphite sheets have a density in the range of about 10 pounds per cubic foot to about 100 pounds per cubic foot, preferably from about 50 pounds per cubic foot to about 90 pounds per cubic foot and a thickness from about 0.003 inch to about 0.060 inch, preferably from about 0.005 to about 0.025 inch. One such material available on the market is "Grafoil" from Union Carbide Corporation.

The annular sealing element 10 of the present invention can be formed by any suitable method. One method involves a preformed stamping of the metallic sheaths 12. The prestamped metallic sheet is placed in a three part die. A washer-shaped slug of Grafoid (die cut from a laminated sheet or a single sheet, or formed in rolled layers) is placed into the mold. In closing the die, the Grafoid material is compressed into the metal stamped protective sheath. If desirable or necessary, a portion 26 of the protective sheath on the outer end surface of the annular sealing element 10 is formed over. As noted in FIGS. 2 and 3, the graphite material is formed into intimate contact with the protective sheath with the edges of the protective sheath at the outer periphery and the outer end surface embedded within the annular sealing element 14.

An extreme-temperature sealing device such as a ball valve or ball joint can be made in accordance with the present invention because of the nature of materials used to construct the annular sealing element. The annular sealing element is composed only of of a flexible expanded graphite material and the protective metal sheath. As is well recognized, graphite and the protective metal sheath can be subjected to very high temperatures or very low temperatures. The construction of the annular sealing element according to the present invention takes advantage of the resiliency and extreme-temperature resistant properties of the expanded graphite material and combines it with the extreme-temperature resistance of metallic sheaths to form the annular sealing element of the present invention. The protective metal sheath is thin enough to allow the seal to be resilient and to conform to a rotatable opposed member without failing after repeated cycling. Depending on the material selected for the protective metal sheath, the annular sealing element of the present invention can withstand temperatures up to about 500° F. and down to about −100° F. If very extreme-temperature materials are chosen such as Inconel 718, temperatures up to about 1000° F. and down to about −450° F. can be serviced.

The annular sealing element of the present invention and a sealing device incorporating such a seal obtains the advantages of an all metal annular seat, namely, extreme-temperature serviceability, without the disadvantages of metal, namely the need for precision machining. The metal sheath protects the resilient graphite annular sealing element 14 from abrasion, but is thin enough to permit the resilient graphite material to expand and compress under pressure while still maintaining the necessary seal between a body member and an opposed rotatable member. Thus, extreme-temperature serviceability is achieved because of the nature of the materials and expensive, precision machining of the protective metal sheath is avoided because its thickness is selected so as to coact with the resilient expanded graphite annular sealing element 14 to permit it to yield and conform to the rotatable opposed member and to the body member under the various pressures subjected on the sealing element. The annular sealing element of the present invention is also cheaper to manufacture than prior art extreme-temperature sealing elements. The ease with which the sealing element of the present invention is formed together with lower production costs increases the types of application to which the sealing element can be put. Additionally, the annular sealing element of the present invention provides the first true fire proof sealing element not entirely composed of metal or other material requiring precision machining.

What is claimed is:

1. An extreme-temperature annular sealing element adapted to form a seal between a rotatable opposed member having a partial spherical sealing surface and a body member comprising:

a flexible expanded graphite body having an outer surface, said flexible expanded graphite body being an annular member, said outer surface of said flexible expanded graphite body having an outer end surface, and an annular contact surface adapted for sealing contact with said rotatable opposed member, said outer end surface of said flexible expanded graphite body comprising a body member contact surface adapted for sealing contact with said body member, said annular contact surface being a curved surface with a radius substantially to conform to said rotatable opposed member, said flexible expanded graphite body being sufficiently resilient to conform and yield under pressure between said rotatable opposed member and said body member, and a metallic protective sheath affixed to a portion of said outer surface of said flexible expanded graphite body, said metallic protective sheath being affixed to said annular contact surface of said flexible expanded graphite body, said metallic protective sheath having a thickness adapted to withstand sliding contact with said rotatable opposed member and adapted to permit said flexible expanded graphite body to resiliently yield to seal said sheath against said rotatable opposed member, said body member contact surface of said outer end of said flexible expanded graphite body being at least partially exposed and adapted for sealing contact with said body member to resiliently yield under pressure between said body member and said rotatable opposed member, said flexible expanded graphite body and said metallic protective sheath being able to withstand temperatures greater than about 500° F. and less than about −100° F.

2. An extreme-temperature annular sealing element as claimed in claim 1 wherein said outer surface of said flexible expanded graphite body comprises an inner circumferential periphery, an inner end surface, and an outer circumferential periphery, and said metallic protective sheath is affixed to said inner circumferential periphery, said inner end surface and a portion of said outer circumferential periphery of said flexible expanded graphite body.

3. An extremem-temperature annular sealing element as claimed in claim 2 wherein said metallic protective sheath has a thickness in the range from about 0.002 inches to about 0.006 inches.

4. An extreme-temperature annular sealing element as claimed in claim 3 wherein said metallic protective sheath has a thickness in the range from about 0.00250 inches to about 0.00425 inches.

5. An extreme-temperature annular sealing element as claimed in claim 3 wherein said metallic sheath is selected from the group consisting of high temperature resistant cobalt alloys and nickel-chromium alloys.

6. An extreme-temperature annular sealing element as claimed in claim 2 wherein said metallic protective sheath is affixed to a portion of said outer end surface of said flexible expanded graphite body.

7. An extreme-temperature annular sealing element as claimed in claim 6 wherein said body member contact surface comprises a projection which extends axially beyond the protective metallic sheath on said outer end surface, said projection having a tendency to be compressed when said annular sealing element is loaded and expanded when said annular sealing element is unloaded.

8. An extreme-temperature annular sealing element as claimed in claim 2 wherein said body member contact surface comprises a sealing projection, said sealing projection having a tendency to be compressed when said annular sealing element is loaded and expanded when said annular sealing element is unloaded.

9. An extreme-temperature annular sealing element as claimed in claim 2 wherein the joint of the metal protective sheath affixed to the annular contact surface and the inner circumferential periphery is rounded.

10. An extreme-temperature annular sealing element as claimed in claim 2 adapted to form a seal against a body member having a port therethrough and wherein the difference between the inner diameter of the seal and the inner diameter of the port divided by the inner diameter of the seal is from about 3% to about 20%.

11. An extreme-temperature annular sealing element as claimed in claim 10 wherein said diameter relationship is from about 5% to about 14%.

12. An extreme-temperature annular sealing element as claimed in claim 2 wherein said metallic protective sheath is a continuous sheath, said inner end surface and said outer end surface of said flexible expanded graphite body lie in substantially parallel planes, said inner circumferential periphery and said outer circumferential periphery are substantially concentric about an axis of said sealing element, and said sealing element is capable of withstanding temperatures down to about −450° F. and up to about 1000° F.

13. An extreme-temperature annular sealing element adapted to form a seal between a rotatable opposed member having a partial spherical sealing surface and a body member comprising:
a flexible expanded graphite body having an outer surface,
said flexible expanded graphite body being an annular member,
said outer surface of said flexible expanded graphite body having an inner circumferential periphery, an annular contact surface adapted for sealing contact with said rotatable opposed member, an inner end surface, an outer circumferential periphery, and an outer end surface,
said outer end surface comprising a body member contact surface adapted for sealing contact with said body member,
said body member contact surface comprising a projection, said projection having a tendency to be compressed when said annular sealing element is loaded and expanded when unloaded,
said annular contact surface having a curved surface with a radius substantially to conform to said rotatable opposed member,
said flexible expanded graphite body being sufficiently resilient to conform and yield under pressure between said rotatable opposed member and said body member, and
a metallic protective sheath affixed to a portion of said outer surface of said flexible expanded graphite body,
said metallic protective sheath being affixed to said inner circumferential periphery, said annular contact surface, said inner end surface, a portion of said outer end surface, and a portion of said outer circumferential periphery of said flexible graphite body,
said metallic protective sheath having a thickness in the range from about 0.002 inches to about 0.006 inches,
said body member contact surface of said outer end of said flexible expanded graphite body being at least partially exposed and adapted for sealing contact with said body member to resiliently yield under pressure between said body member and said rotatable opposed member,
said flexible expanded graphite body and said metallic protective sheath being able to withstand temperatures greater than about 500° F. and less than about −100° F.

14. An extreme-temperature annular sealing element as claimed in claim 13 wherein said metallic sheath has a thickness in the range from about 0.00250 to about 0.00425 inches.

15. An extreme-temperature annular sealing element as claimed in claim 14 wherein said metallic protective sheath is selected from the group consisting of high temperature resistant cobalt alloys and nickel-chromium alloys.

16. An extreme-temperature annular sealing element as claimed in claim 13 wherein the joint of the metal protective sheath affixed to the annular contact surface and the inner circumferential periphery is rounded.

17. An extreme-temperature annular sealing element as claimed in claim 13 adapted to form a seal against a body member having a port therethrough and wherein the difference between the inner diameter of the seal and the inner diameter of the port divided by the inner diameter of the seal is from about 3% to about 20%.

18. An extreme-temperature annular sealing element as claimed in claim 17 wherein said diameter relationship is from about 5% to about 14%.

19. An extreme-temperature annular sealing element as claimed in claim 13 wherein said annular sealing element is able to withstand temperatures down to about −450° F. to withstand temperatures up to about 1000° F.

20. An extreme-temperature annular sealing element as claimed in claim 13 wherein said metallic sheath is a continuous sheath, said inner and outer end surfaces of said flexible graphite body lie in substantially parallel planes, and said inner and outer circumferential peripheries of said flexible graphite body are substantially concentric about an axis of said annular sealing element.

21. In an extreme-temperature sealing device having a rotatable opposed member having a partially spherical sealing surface, a body member, and an annular sealing element forming a seal between said rotatable opposed member and said body member, the improvement wherein said annular sealing element is an extreme-temperature annular sealing element comprising:

a flexible expanded graphite body having an outer surface, said flexible expanded graphite body being an annular member, said outer surface of said flexible expanded graphite having an outer end surface, and an annular contact surface adapted for sealing contact with said rotatable opposed member, said outer end surface of said flexible expanded graphite body comprising a body member contact surface in sealing contact with said body member, said annular contact surface being a curved surface with a radius substantially to conform to said rotatable opposed member, said flexible expanded graphite body being sufficiently resilient to conform and yield under pressure between said rotatable opposed member and said body member, and a metallic protective sheath affixed to a portion of said outer surface of said flexible expanded graphite body, said metallic protective sheath being affixed to said annular contact surface of said flexible expanded graphite body, said metallic protective sheath having a thickness to withstand sliding contact with said rotatable opposed member and to permit said flexible expanded graphite body to resiliently yield to seal said sheath against said rotatable opposed member, said body member contact surface of said outer end of said flexible expanded graphite body being at least partially exposed and in sealing contact with said body member to resiliently yield under pressure between said body member and said rotatable opposed member, said flexible expanded graphite body and said metallic protective sheath being able to withstand temperatures greater than about 500° F. and less than about −100° F.

22. An extreme-temperature sealing device as claimed in claim 21 wherein said outer surface of said flexible expanded graphite body comprises an inner circumferential periphery, an inner end surface, and an outer circumferential periphery, and said metallic protective sheath is affixed to said inner circumferential periphery, said inner end surface and a portion of said outer circumferential periphery of said flexible expanded graphite body.

23. An extreme-temperature sealing device as claimed in claim 22 wherein said metallic protective sheath has a thickness in the range from about 0.002 inches to about 0.006 inches.

24. An extreme-temperature sealing device as claimed in claim 23 wherein said metallic protective sheath has a thickness in the range from about 0.00250 inches to about 0.00425 inches.

25. An extreme-temperature sealing device as claimed in claim 23 wherein said metallic sheath is selected from the group consisting of high temperature resistant cobalt alloys and nickel-chromium alloys.

26. An extreme-temperature sealing device as claimed in claim 22 wherein said metallic protective sheath is affixed to a portion of said outer end surface of said flexible expanded graphite body.

27. An extreme-temperature sealing device as claimed in claim 26 wherein said body member contact surface comprises a projection which extends axially beyond the protective metallic sheath on said outer end surface, said projection having a tendency to be compressed when said annular sealing element is loaded and expanded when said annular sealing element is unloaded.

28. An extreme-temperature sealing device as claimed in claim 22 wherein said body member contact surface comprises a sealing projection, said sealing projection having a tendency to be compressed when said annular sealing element is loaded and expanded when said annular sealing element is unloaded.

29. An extreme-temperature sealing device as claimed in claim 22 wherein the joint of the metal protective sheath affixed to the annular contact surface and the inner circumferential periphery is rounded.

30. An extreme-temperature sealing device as claimed in claim 22 wherein said body member has a port therethrough and wherein the difference between the inner diameter of the seal and the inner diameter of the port divided by the inner diameter of the seal is from about 3% to about 20%.

31. An extreme-temperature annular sealing element as claimed in claim 30 wherein said diameter relationship is from about 5% to about 14%.

32. An extreme-temperature sealing device as claimed in claim 22 wherein said metallic protective sheath is a oontinuous sheath, said inner end surface and said outer end surface of said flexible expanded graphite body lie in substantially parallel planes, and said inner circumferential periphery and said outer circumferential periphery are substantially concentric about an axis of said sealing element.

33. An extreme-temperature sealing device as claimed in claim 21 wherein said annular sealing element is capable of withstanding temperatures down to about −450° F. and up to about 1000° F.

* * * * *